United States Patent [19]

Halldin

[11] 4,310,191

[45] Jan. 12, 1982

[54] WHEELS HAVING HARD PARTICLES DISTRIBUTED IN METALLIC TREAD

[75] Inventor: Henry Halldin, Vesterås, Sweden

[73] Assignee: ASEA Aktiebolag, Vesterås, Sweden

[21] Appl. No.: 1,748

[22] Filed: Jan. 8, 1979

[30] Foreign Application Priority Data

Jan. 10, 1978 [SE] Sweden .............................. 7800227

[51] Int. Cl.³ .............................................. B60B 17/00
[52] U.S. Cl. ................................................ 295/31 R
[58] Field of Search ....................... 295/30, 31 R, 1, 8, 295/34

[56] References Cited

U.S. PATENT DOCUMENTS

| 1,666,167 | 4/1928 | Connolly | 295/31 R |
| 2,226,876 | 12/1940 | Schmidt | 295/31 R |
| 2,877,716 | 3/1959 | Ryznar | 295/31 R |
| 3,107,115 | 10/1963 | Kastner | 295/31 R |

Primary Examiner—Richard A. Bertsch
Attorney, Agent, or Firm—Watson, Cole, Grindle & Watson

[57] ABSTRACT

The present invention relates to railbound vehicles equipped with wheels which include a rail-contacting wear layer made of a metallic material which has evenly distributed therein hard particles, such as carbides, oxides, borides or nitrides, for increasing the frictional characteristics of the wheel.

13 Claims, 1 Drawing Figure

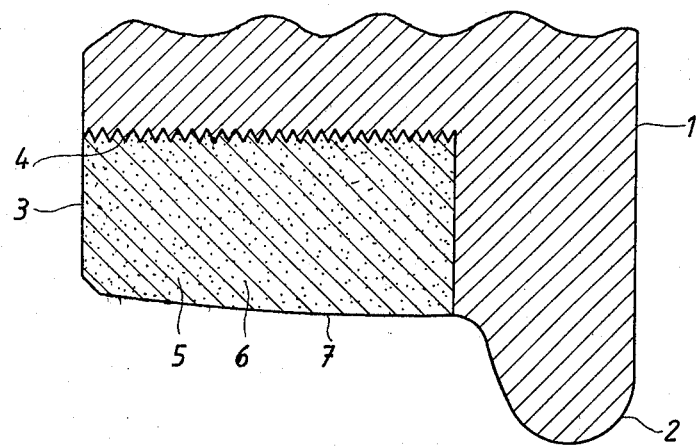

WHEELS HAVING HARD PARTICLES DISTRIBUTED IN METALLIC TREAD

BACKGROUND OF THE INVENTION

1. Field of the Invention

The present invention relates to railbound vehicles with wheels, and specifically to wheels used in such vehicles which include a wear layer containing a friction-increasing material intended to achieve more constant friction ratios between the wheel and the rail which it contacts. The invention is directed both to solid wheels, i.e., wheels made in one piece, and to built-up wheels which include a wheel centre and a tire with a tread a flange positioned around the wheel centre.

2. The Prior Art

The amount of friction which occurs between the wheel of a railbound vehicle and the rail upon which it moves is known to vary considerably depending on the weather and the surface coating on the rail, such as oil or water and solid substances, which forms a lubricating layer on the rail.

The friction may vary with time and space because of rapid changes of factors influencing the friction. The coefficient of friction may vary considerably and may be between 0.07 and 0.7. In case of a high coefficient of friction, the tractive and braking forces are good but the track forces are great, the flange wear great and the running properties less good. In case of a low coefficient of friction, the risks of slipping increase and the wheels may be easily locked upon braking so that the wheels will become non-round. Since a high friction is desirable between the tread of the wheel and the rail, and a low friction is desirable between the wheel flange and the rail, attempts have been made to influence the friction so that the desired friction ratios are obtained. The classical method of increasing the coefficient of friction between the wheel and the rail is by sanding the rail. The sand grains break through the friction-reducing layers and are pressed into the materials of the wheel and the rail at the point of contact, thus improving the adhesion. It is also known to improve the adhesion by coating the tread with a thin layer of a friction-increasing material, but the hitherto known coatings have been easily worn out. It has therefore been necessary to renew the layers at short intervals. It is also known to heat-treat the tread of the wheel and the wheel flange differently, so that greater friction is obtained between the wheel tread and the rail than between the flange and the rail.

SUMMARY OF THE PRESENT INVENTION

The wheel of the vehicle according to the invention is characterised in that the wear layer which includes the tread consists of a wheel material, known per se, in which hard, friction-increasing particles are embedded. The particles consist of grains in a matrix material. By wear layer is meant the whole of the material layer inside and including the tread that is worn and removed during re-turning operations before the wheel or tire must be scrapped. The wear layer is thus the layer between and including the original tread of a wheel and the wear limit at which scrapping shall be performed. The wear layer has a thickness of at least 10 mm, usually between 20 mm and 60 mm. The hard particles are substantially evenly distributed within the radial extension of the whole wear layer. Constant friction ratios can therefore be maintained during the entire life of the wheel. In railway locomotive wheels the basic material in the wear layer may consist of high-tensile steel alloys, for example, alloys containing 0.55% C, 0.35% Si, 0.80% Mn, 0.90% Cr and 0.30% Mo, or the like. The hard particles, which are embedded in the basic material of the wear layer, may consist of grains of titanium carbide or tungsten carbide, nitrides, for example, aluminium nitrides, borides, for example, zirconium borides, or of oxide grains of, for example, aluminium oxide. Iron-bound titanium carbide, which is sold under the trade mark FERROTIC, can be used.

The friction-increasing effect depends partly on the amount of hard particles, partly on the size of the hard particles. A noticeable friction-increasing effect is obtained already at 0.1 to 0.2 percent by volume of hard particles in the wear layer of the tread. The lower limit of a really apparent friction-increasing effect lies at about 0.5 percent by volume of hard particles. The particle size is also of decisive importance. For a grain embedded in the surface layer of the tread to cause a real friction-increasing effect, it is required that the grain shall be able to break through friction-reducing layers between the wheel and the rail. A necessary minimum size is between 5 microns and 10 microns. Too large grains may have an adverse effect on the fatigue strength by initiating formation of cracks. The maximum grain size should be below 500 microns, preferably below 100 microns. The optimum grain size should be between 20 microns and 100 microns.

The necessary particle size is such that it is impossible to achieve it by heat treatment of known steel alloys suitable for wheels. Carbides precipitated during heat treatment have a grain size normally lying below 1 micron. Grains of hard material must therefore be mixed into the material for the wear layer of the tread when the layer is built up. The wear layer may advantageously be manufactured by hot isostatic pressing (HIP) of a powder mixture of powder of normal material intended for railway wheels and hard grains of the friction-increasing material. For example, a wheel or a tire may be manufactured in the normal manner but a recess can be made at the side of the flange. A layer of powder with hard particles, forming the wear layer and the tread, can be applied in this recess. The wheel or tire is enclosed in a deformable sheet casing, whereupon it is subjected to hot isostatic pressing at a suitable temperature and a suitable pressure so that the powder is sintered and joined to the underlying material and forms a wear layer and tread of the desired size. To improve the adhesion between the wheel material and the wear layer, the wheel may be provided with turned V-shaped or trapezoidal grooves. It is also possible to make the whole wheel or tire of powder. The main part is then made of one material and the wear and tread section of one material with hard particles mixed into it. The matrix material for the wear layer section may, on the other hand, be the same as the material in the main part of the wheel.

DESCRIPTION OF THE DRAWING

The invention will be described in more detail with reference to the accompanying FIGURE.

In the FIGURE shown in the drawing, 1 designates a wheel centre of a forged material. The flange 2 is formed from the wheel material. The wheel centre may be provided with a turned cavity 3 having triangular grooves 4. A powdered material 5 with hard particles 6 mixed therein, which has a sufficient volume to fill up the cavity after hot isostatic pressing to the full theoretical density, has been laid around the wheel centre. This powder forms the conical wear layer of the finished wheel. During the pressing, the center portion of the wheel has been surrounded with a sheet metal casing preventing pressure medium from penetrating into the powder. After the pressing, this case has been removed and the wheel has been machined to the desired flange and tread profile 7. The thickness of the material layer containing hard particles is at least 10 mm, suitably between 20 and 60 mm.

I claim:

1. In a railbound vehicle which includes wheels for movably supporting the vehicle on rails, each of said wheels including a center portion, a guiding flange at one end thereof and a tread, the improvement wherein said tread is formed as the outermost surface of a conical wear layer positioned around said center portion of said wheel, said wear layer being formed of a metallic compound in which are evenly distributed hard friction-increasing particles of a material selected from the group consisting of carbide grains, oxide grains, nitride grains and boride grains having a size of greater than 5 microns.

2. In a vehicle as described in claim 1 wherein said wear layer has a thickness of at least 10 mm.

3. In a vehicle as described in claim 2 wherein said wear layer has a thickness of between 20 and 60 mm.

4. In a vehicle as described in claim 1 wherein said hard particles have a size of between about 5 and 500 microns.

5. In a vehicle as described in claim 4 wherein said hard particles have a size of between about 10 and 100 microns.

6. In a vehicle as described in claim 1 wherein said hard particles comprise titanium carbide grains.

7. In a vehicle as described in claim 1 wherein said hard particles comprise tungston carbide grains.

8. In a vehicle as described in claim 1 wherein said hard particles comprise aluminum oxide grains.

9. In a vehicle as described in claim 1 wherein said hard particles comprise aluminum nitride grains.

10. In a vehicle as described in claim 1 wherein said hard particles comprise zirconium boride grains.

11. In a vehicle as described in claim 1 wherein said hard particles are utilized in an amount of at least 0.1% by volume of said metallic compound.

12. In a vehicle as described in claim 1 wherein said metallic compound is a steel alloy.

13. In a vehicle as described in claim 12 wherein said steel alloy contains 0.55% C, 0.35% Si, 0.80% Mn, 0.90% Cr and 0.30% Mn.

* * * * *